(12) United States Patent
Miyashita et al.

(10) Patent No.: US 9,827,925 B2
(45) Date of Patent: Nov. 28, 2017

(54) DRIVING ENVIRONMENT PREDICTION DEVICE, VEHICLE CONTROL DEVICE AND METHODS THEREOF

(75) Inventors: Michihiro Miyashita, Susono (JP); Koji Ito, Nagoya (JP); Nobukazu Ueki, Susono (JP); Kouhei Tochigi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 553 days.

(21) Appl. No.: 14/357,815

(22) PCT Filed: Nov. 18, 2011

(86) PCT No.: PCT/JP2011/006452
§ 371 (c)(1),
(2), (4) Date: May 13, 2014

(87) PCT Pub. No.: WO2013/072976
PCT Pub. Date: May 23, 2013

(65) Prior Publication Data
US 2014/0316628 A1    Oct. 23, 2014

(51) Int. Cl.
*B60R 16/023*        (2006.01)
*F02N 11/08*         (2006.01)

(52) U.S. Cl.
CPC ...... *B60R 16/0236* (2013.01); *F02N 11/0837* (2013.01); *F02N 2200/061* (2013.01);
(Continued)

(58) Field of Classification Search
CPC combination set(s) only.
See application file for complete search history.

(56) References Cited

U.S. PATENT DOCUMENTS

| 6,035,241 A * | 3/2000 | Yamamoto ............. E02F 3/844 172/45 |
| 2002/0134093 A1* | 9/2002 | Aoki ...................... B60H 1/005 62/133 |

(Continued)

FOREIGN PATENT DOCUMENTS

| JP | 2002-356112 A | 12/2002 |
| JP | 2005291158   | 10/2005 |

(Continued)

*Primary Examiner* — Thomas G Black
*Assistant Examiner* — Ana Thomas
(74) *Attorney, Agent, or Firm* — Andrews Kurth Kenyon LLP

(57) ABSTRACT

There is a need to predict a driving environment with high responsiveness by a simple configuration. There is provided a driving environment prediction device that predicts a driving environment of a vehicle that causes a vehicle stop. The driving environment prediction device comprises: a first vehicle stop time rate calculator which is configured to calculate a rate of vehicle stop time in a first period, as a first vehicle stop time rate (shorter-period vehicle stop time rate); a second vehicle stop time rate calculator which is configured to calculate a rate of vehicle stop time in a second period which is longer than the first period, as a second vehicle stop time rate (longer-period vehicle stop time rate); and a driving environment predictor which is configured to predict the driving environment, based on the shorter-period vehicle stop time rate and the longer-period vehicle stop time rate.

10 Claims, 11 Drawing Sheets

(52) U.S. Cl.
CPC .......................... *F02N 2200/0801* (2013.01); *F02N 2200/125* (2013.01); *Y02T 10/48* (2013.01); *Y02T 10/84* (2013.01)

(56) References Cited

U.S. PATENT DOCUMENTS

| | | | | |
|---|---|---|---|---|
| 2002/0188387 | A1* | 12/2002 | Woestman | B60K 6/00 701/22 |
| 2010/0305799 | A1 | 12/2010 | Yamada et al. | |
| 2011/0071712 | A1* | 3/2011 | Mizuno | B60K 6/46 701/22 |

FOREIGN PATENT DOCUMENTS

| | | |
|---|---|---|
| JP | 2007-019341 A | 1/2007 |
| JP | 2010-269712 A | 12/2010 |

\* cited by examiner

AT INTERVALS OF 60 SECONDS/ TOTAL OF 10 MINUTES

AT INTERVALS OF 90 SECONDS/ TOTAL OF 15 MINUTES

SHORTER-PERIOD VEHICLE STOP TIME RATE RS

LONGER-PERIOD VEHICLE STOP TIME RATE RL

DRIVING ENVIRONMENT PREDICTION DEVICE, VEHICLE CONTROL DEVICE AND METHODS THEREOF

CROSS-REFERENCE TO RELATED APPLICATIONS

This is a national phase application based on the PCT International Patent Application No. PCT/JP2011/006452 filed Nov. 18, 2011, the entire contents of which are incorporated herein by reference.

TECHNICAL FIELD

The present invention relates to a technology of predicting a driving environment of a vehicle that causes a vehicle stop and a technology of controlling a vehicle.

BACKGROUND ART

Accompanied with the requirement for improvement in fuel consumption, automobiles performing idle reduction control have recently drawn attention. In the automobile performing idle reduction control, there is a proposed technique of increasing the state of charge in a battery upon prediction of a traffic jam based on traffic congestion prediction information by an automotive navigation system (Patent Literature 1). An increase in number of engine stops by idle reduction control in a traffic jam increases consumption of the state of charge in the battery. The state of charge in the battery is thus increased in advance, upon prediction of a traffic jam.

The device of Patent Literature 1 is thought to predict a traffic jam as the driving environment causing a vehicle stop, which leads to an engine stop by idle reduction control. Another proposed device predicts running in an urban area as the driving environment causing a vehicle stop (Patent Literature 2). This device predicts running in an urban area, based on the average vehicle speed and the number of vehicle stops in a past given time.

CITATION LIST

Patent Literatures

PTL 1: JP 2010-269712A
PTL 2: JP 2002-356112A

The device described in Patent Literature 1, however, requires the automotive navigation system and accordingly has a problem of the complicated configuration. The device described in Patent Literature 2, on the other hand, requires the relatively long-time observation and accordingly has a problem of the poor responsiveness.

SUMMARY OF INVENTION

Technical Problem

In order to solve the above problems, an object of the invention is to predict a driving environment with high responsiveness by a simple configuration.

Solution to Problem

The invention may be implemented by any of the following aspects and embodiments, in order to solve at least part of the above problems.

[Aspect 1]
There is provided a driving environment prediction device that predicts a driving environment of a vehicle that causes a vehicle stop. The driving environment prediction device comprises: a vehicle stop time rate calculator which is configured to calculate a rate of vehicle stop time in a predetermined period; and a driving environment predictor which is configured to predict the driving environment, based on the rate of vehicle stop time.

The driving environment prediction device of this aspect specifies the driving environment based on the rate of vehicle stop time in the predetermined period. This aspect predicts the driving environment with achieving both the responsiveness and the accuracy by the simple configuration.

[Aspect 2]
There is provided the driving environment prediction device according to Aspect 1, wherein the vehicle stop time rate calculator comprises: a first vehicle stop time rate calculator which is configured to calculate a rate of vehicle stop time in a first period, as a first vehicle stop time rate; and a second vehicle stop time rate calculator which is configured to calculate a rate of vehicle stop time in a second period which is longer than the first period, as a second vehicle stop time rate. The driving environment predictor predicts the driving environment, based on the first vehicle stop time rate and the second vehicle stop time rate.

The driving environment prediction device of this aspect specifies the driving environment, based on the first vehicle stop time rate calculated in the first period which is the shorter period between the first and second periods and the second vehicle stop time rate calculated in the second period which is the longer period. The first vehicle stop time rate is determined in the shorter period, so that prediction based on the first vehicle stop time rate enables the driving environment to be specified with high responsiveness. The second vehicle stop time rate is determined in the longer period, so that prediction based on the second vehicle stop time rate enables the driving environment to be specified with high accuracy. Accordingly, this aspect predicts the driving environment with achieving both the responsiveness and the accuracy by the simple configuration.

[Aspect 3]
There is provided the driving environment prediction device according to Aspect 2, wherein the driving environment is classification of whether a vehicle driving area is an urban area or a suburban area. The driving environment predictor comprises: a first determining section which is configured to determine whether the first vehicle stop time rate is equal to or higher than a first reference value; and a first specifying section which is configured to specify the driving environment as the urban area when it is determined that the first vehicle stop time rate is equal to or higher than the first reference value by the first determining section.

The driving environment prediction device of this aspect allows for specification as an urban area with high responsiveness by simply determining whether the first vehicle stop time rate is equal to or higher than the first reference value.

[Aspect 4]
There is provided the driving environment prediction device according to Aspect 3, wherein the driving environment predictor further comprises: a second determining section which is configured to determine whether the second vehicle stop time rate is equal to or higher than a second reference value which is smaller than the first reference value; and a second specifying section which is configured to specify the driving environment as the urban area when it is determined that the second vehicle stop time rate is equal to or higher than the second reference value by the second determining section.

The driving environment prediction device of this aspect specifies the driving environment as an urban area, when the first vehicle stop time rate is equal to or higher than the first reference value or when the second vehicle stop time rate is equal to or higher than the second reference value. This allows for the quicker specification and thereby ensures prediction with high responsiveness.

[Aspect 5]

There is provided the driving environment prediction device according to either Aspect 3 or Aspect 4, wherein the driving environment predictor further comprises: a third determining section which is configured to determine whether the first vehicle stop time rate is less than a third reference value which is smaller than the first reference value; a fourth determining section which is configured to determine whether the second vehicle stop time rate is less than a fourth reference value which is smaller than the second reference value; and a third specifying section which is configured to specify the driving environment as the suburban area when it is determined that the first vehicle stop time rate is less than the third reference value by the third determining section and when it is determined that the second vehicle stop time rate is less than the fourth reference value by the fourth determining section.

The driving environment prediction device of this aspect provides hysteresis in classification between an urban area and a suburban area, thereby preventing hunting in result of prediction.

[Aspect 6]

There is provided a vehicle control device mounted on a vehicle having an engine and a battery chargeable with an amount of electric power generated by a generator which is driven with power of the engine. The vehicle control device comprises: an idle reduction controller which is configured to perform idle reduction control; an SOC detector which is configured to detect a state of charge (SOC) of the battery; an idle reduction capacity setting section which is configured to set a capacity for idle reduction, which is expected to be used in a stop and start period from an engine stop to an engine restart by the idle reduction control, in an available SOC range of the battery, during running of the vehicle; and a remaining capacity controller which is configured to control the amount of electric power generated by the generator, in order to avoid a remaining capacity, which corresponds to the SOC detected by the SOC detector, in the available SOC range from becoming less than the capacity for idle reduction, during running of the vehicle. The idle reduction capacity setting section comprises: a vehicle stop time rate calculator which is configured to calculate a rate of vehicle stop time in a predetermined period; and a capacity setting section which is configured to set the capacity for idle reduction, based on the rate of vehicle stop rate.

The vehicle control method of this aspect enables the capacity for idle reduction to be adequately determined in the available SOC range of the battery by taking into account the driving environment of the vehicle that causes a vehicle stop.

[Aspect 7]

There is provided the vehicle control device according to Aspect 6, wherein the vehicle stop time rate calculator comprises: a first vehicle stop time rate calculator which is configured to calculate a rate of vehicle stop time in a first period, as a first vehicle stop time rate; and a second vehicle stop time rate calculator which is configured to calculate a rate of vehicle stop time in a second period which is longer than the first period, as a second vehicle stop time rate. The capacity setting section sets the capacity for idle reduction, based on the first vehicle stop time rate and the second vehicle stop time rate.

The vehicle control device of this aspect enables the capacity for idle reduction to be more adequately determined in the available SOC range of the battery.

[Aspect 8]

There is provided the vehicle control device according to Aspect 7, wherein the capacity setting section comprises: a first determining section which is configured to determine whether the first vehicle stop time rate is equal to or higher than a first reference value; and a first specifying section which is configured to, when it is determined that the first vehicle stop time rate is equal to or higher than the first reference value by the first determining section, set the capacity for idle reduction to a larger value than a capacity set when it is determined that the first vehicle stop time rate is neither equal to nor higher than the first reference value.

The vehicle control device of this aspect increases the capacity for idle reduction when it is determined that the first vehicle stop time rate is equal to or higher than the first reference value. This results in more adequately determining the capacity for idle reduction.

[Aspect 9]

There is provided the vehicle control device according to Aspect 8, wherein the capacity setting section further comprises: a second determining section which is configured to determine whether the second vehicle stop time rate is equal to or higher than a second reference value which is smaller than the first reference value; and a second specifying section which is configured to, when it is determined that the second vehicle stop time rate is equal to or higher than the second reference value by the second determining section, set the capacity for idle reduction to a larger value than a capacity set when it is determined that the second vehicle stop time rate is neither equal to nor higher than the second reference value.

The vehicle control device of this aspect increases the capacity for idle reduction when it is determined that the second vehicle stop time rate is equal to or higher than the second reference value which is smaller than the first reference value. This results in more adequately determining the capacity for idle reduction.

[Aspect 10]

There is provided the vehicle control device according to either Aspect 8 or Aspect 9, wherein the idle reduction capacity setting section further comprises: a third determining section which is configured to determine whether the first vehicle stop time rate is less than a third reference value which is smaller than the first reference value; a fourth determining section which is configured to determine whether the second vehicle stop time rate is less than a fourth reference value which is smaller than the second reference value; and a third specifying section which is configured to set the capacity for idle reduction to a decreased value, when it is determined that the first vehicle stop time rate is less than the third reference value by the third determining section and when it is determined that the second vehicle stop time rate is less than the fourth reference value by the fourth determining section.

The vehicle control device of this aspect reduces the capacity for idle reduction, when it is determined that the first vehicle stop time rate is less than the third reference value which is smaller than the first reference value and when it is determined that the second vehicle stop time rate is less than the fourth reference value which is smaller than the second reference value. This results in more adequately determining the capacity for idle reduction, while preventing hunting in control of the capacity for idle reduction.

[Aspect 11]

There is provided a driving environment prediction method of predicting a driving environment of a vehicle that causes a vehicle stop. The driving environment prediction method comprises: calculating a rate of vehicle stop time in a predetermined period; and predicting the driving environment, based on the rate of vehicle stop time.

The driving environment prediction method of this aspect predicts the driving environment with achieving both the responsiveness and the prediction accuracy, like the driving environment prediction device of Aspect 1.

[Aspect 12]

There is provided a vehicle control method of controlling a vehicle having an engine and a battery chargeable with an amount of electric power generated by a generator which is driven with power of the engine. The vehicle control method comprises the steps of: (a) performing idle reduction control; (b) detecting a state of charge (SOC) of the battery; (c) setting a capacity for idle reduction, which is expected to be used in a stop and start period from an engine stop to an engine restart by the idle reduction control, in an available SOC range of the battery, during running of the vehicle; and (d) controlling the amount of electric power generated by the generator, in order to avoid a remaining capacity, which corresponds to the SOC detected by the SOC detector, in the available SOC range from becoming less than the capacity for idle reduction, during running of the vehicle. The step (c) comprises: calculating a rate of vehicle stop time in a predetermined period; and setting the capacity for idle reduction, based on the rate of vehicle stop rate.

The vehicle control method of this aspect enables the capacity for idle reduction to be determined adequately in the available SOC range of the battery, like the vehicle control device of Aspect 6.

The invention may be implemented by any of various aspects other than those described above. For example, the invention may be configured as: a vehicle equipped with the driving environment prediction device according to any one of Aspects 1 to 5; a vehicle equipped with the vehicle control device according to any one of Aspects 6 to 10; a driving environment prediction method including steps corresponding to the respective components included in the driving environment prediction device according to any one of Aspects 2 to 5; a vehicle control method including steps corresponding to the respective components included in the vehicle control device according to any one of Aspects 6 to 10; a computer program that causes a computer to perform the respective steps included in the driving environment prediction method according to Aspect 11; and a computer program that causes a computer to perform the respective steps included in the vehicle control method according to Aspect 12.

DESCRIPTION OF EMBODIMENTS

Figure 1:
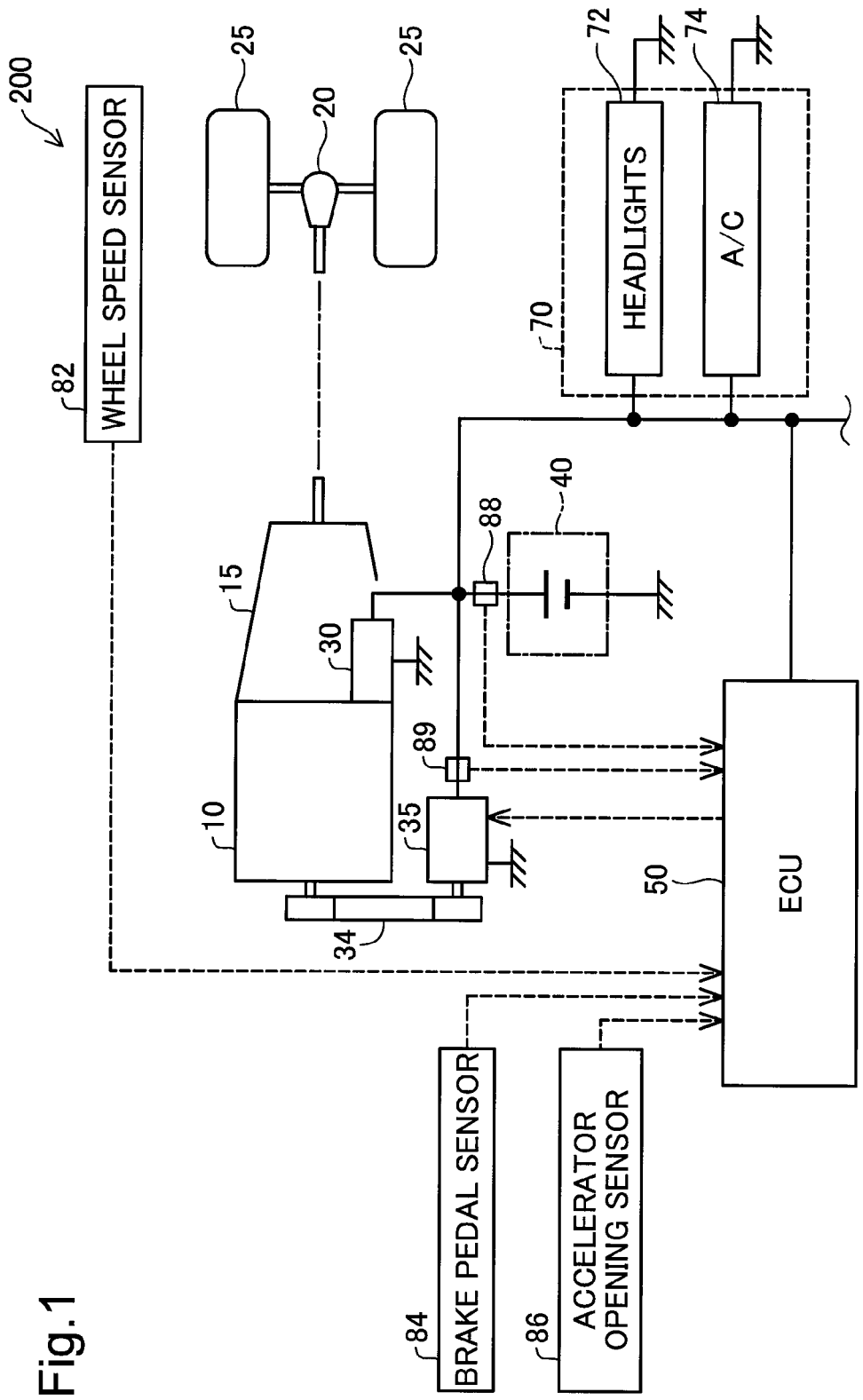
FIG. 1 is a diagram illustrating the configuration of an automobile 200 according to an embodiment of the invention.

Some aspects of the invention are described below with reference to embodiments in the following sequence:
A. General Configuration
B. Configuration of ECU
C. Configuration of Target SOC Estimator
D. Driving Environment Prediction Method
E. Advantageous Effects of Embodiment
F. Modifications A. General Configuration FIG. 1 is a diagram illustrating the configuration of an automobile 200 according to an embodiment of the invention. The automobile 200 is a vehicle having idle reduction function. The automobile 200 includes an engine 10, an automatic transmission 15, a differential gear 20, drive wheels 25, a starter 30, an alternator 35, a battery 40 and an electronic control unit (ECU) 50.

The engine 10 is an internal combustion engine that generates power by combustion of a fuel such as gasoline or light oil. The power of the engine 100 is transmitted to the automatic transmission 15, while being transmitted to the alternator 35 via a drive mechanism 34. The output of the engine 10 is changed by an engine control computer (not shown) according to the pressure of an accelerator pedal (not shown) stepped on by the driver.

The automatic transmission 15 automatically changes the gear ratio (so-called gear shifting). The power (rotation speed·torque) of the engine 10 is subjected to gear shifting by the automatic transmission 15 and is transmitted as a desired rotation speed·torque via the differential gear 20 to the left and right drive wheels 25. The power of the engine 10 is changed according to the accelerator pedal pressure and is transmitted via the automatic transmission 15 to the drive wheels 25 to accelerate or decelerate the vehicle (automobile 200).

This embodiment employs a belt drive configuration as the drive mechanism 34 transmitting the power of the engine 10 to the alternator 35. The alternator 35 uses part of the power of the engine 10 to generate electric power. The alternator 35 is a type of generator. The generated electric power is used to charge the battery 40 via an inverter (not shown). In the description hereof, power generation by the alternator 35 using the power of the engine 10 is called "fuel power generation".

The battery 40 is a lead acid battery serving as a DC power source for a voltage of 14 V and supplies electric power to peripheral devices provided other than the engine main body. In the description hereof, the peripheral devices provided other than the engine main body and operated with electric power of the battery 40 are called "auxiliary machines". The group of auxiliary machines is called "auxiliary machinery". The automobile 200 includes, for example, head lights 72 and an air conditioner (A/C) 74 as the auxiliary machinery 70.

The starter 30 is a self starter to start the engine 10 with electric power supplied from the battery 40. In general, when the driver operates an ignition switch (not shown) to start driving an automobile at a stop, the starter 30 is activated to start the engine 10. This starter 30 is used to restart the engine 10 in the no idling state as described later. In the description hereof, the no idling state means the engine stop state by idle reduction control.

The ECU 50 includes a CPU that performs computer programs, a ROM that stores computer programs and others, a RAM that temporarily stores data and input/output ports connected with, for example, various sensors and actuators. The sensors connected with the ECU 50 include: a wheel speed sensor 82 that detects the rotation speed of the drive wheels 25; a brake pedal sensor 84 that detects depression or non-depression of a brake pedal (not shown): an accelerator opening sensor 86 that detects the pressure of an accelerator pedal (not shown) as an accelerator opening; a battery current sensor 88 that detects the charge-discharge current of the battery 40; and an alternator current sensor 89 that detects the output current of the alternator 35. The actuators include the starter 30 and the alternator 35. The ECU 50 receives the supply of electric power from the battery 40.

The ECU 50 controls the starter 30 and the alternator 35 based on signals from the various sensors mentioned above and an engine control computer (not shown), so as to control engine stops and restarts (idle reduction control) and control the SOC of the battery 40.

B. Configuration of ECU

Figure 2:
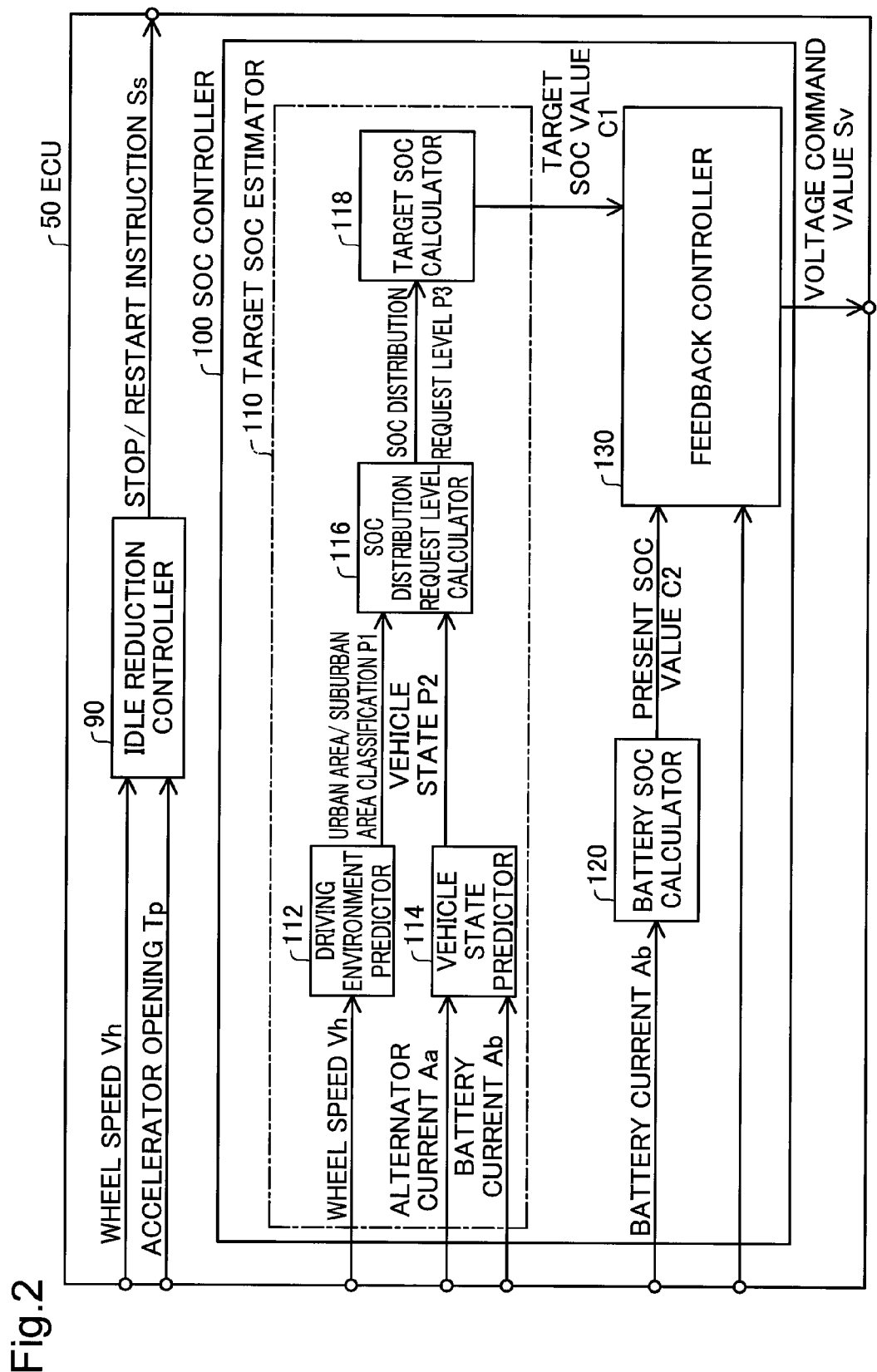
FIG. 2 is a diagram illustrating the functional configuration of an ECU 50.

FIG. 2 is a diagram illustrating the functional configuration of the ECU 50. As illustrated, the ECU 50 includes an idle reduction controller 90 and an SOC controller 100. The functions of the idle reduction controller 90 and the SOC controller 100 are actually implemented by the CPU included in the ECU 50 executing the computer programs stored in the ROM.

The idle reduction controller 90 obtains a wheel speed Vh detected by the wheel speed sensor 82 and an accelerator opening Tp detected by the accelerator opening sensor 86 and outputs an instruction Ss to stop/restart the engine 10 to the starter 30. The stop/restart instruction Ss includes an engine restart instruction which is output to the starter 30 and a fuel cutoff instruction which is output to a fuel supply system (not shown) of the engine 10. More specifically, the idle reduction controller 90 determines that an engine stop condition is satisfied and outputs the fuel cutoff instruction to the fuel supply system, when the wheel speed Vh is reduced below a predetermined speed (for example, 10 km/h). The idle reduction controller 90 determines that an engine restart condition is satisfied and outputs the engine restart instruction to the starter 30, when depression of the accelerator pedal is subsequently detected based on the accelerator opening Tp.

In other words, the idle reduction controller 90 stops the engine 10 when the engine stop condition is satisfied, and restarts the engine 10 when the engine restart condition is satisfied after the engine stop. The engine stop condition and the engine restart condition are not limited to those described above. For example, the engine stop condition may be that the wheel speed Vh is fully reduced to 0 km/h, and the engine restart condition may be that the driver releases the brake pedal.

The SOC controller 100 includes a target SOC estimator 110, a battery SOC calculator 120 and a feedback controller 130. The target SOC estimator 110 estimates an SOC expected to be used during a time period from an engine stop to an engine restart (hereinafter called "stop and start period") by idle reduction control during vehicle running (for example, when the wheel speed Vh>0 km/h), as a target SOC (hereinafter also called "target SOC value") C1. The detailed configuration will be described in Chapter C. The "SOC" herein is defined as a value obtained by dividing the electric charge remaining in the battery by the electric charge accumulated in the battery in the fully charged state.

The battery SOC calculator 120 calculates a current SOC (hereinafter called "present SOC value") C2 of the battery 40, based on charge-discharge current (called "battery current") Ab of the battery 40 detected by the battery current sensor 88. More specifically, the battery SOC calculator 120 calculates the present SOC value C2 by integrating the charge-discharge currents Ab with setting the charge currents of the battery 40 to positive values and setting the discharge currents of the battery 40 to negative values. The configuration of the battery current sensor 88 and the battery SOC calculator 120 corresponds to the "SOC detector" described in [Solution to Problem]. The SOC detector is not necessarily limited to the configuration that makes a calculation based on the battery current detected by the battery current sensor 88 but may be configured to make a calculation based on, for example, a battery electrolytic solution specific gravity sensor, a cell voltage sensor or a battery terminal voltage sensor. Moreover, the SOC detector is not necessarily limited to the configuration that detects the electric charge remaining in the battery but may be configured to detect the state of charge using another parameter, for example, a chargeable amount.

The feedback controller 130 calculates a difference by subtracting the present SOC value C2 from the target SOC value C1 during vehicle running and determines a voltage command value Sv that makes the calculated difference equal to a value 0 by feedback control. This voltage command value Sv indicates the amount of power to be generated by the alternator 35 and is sent to the alternator 35. As a result, the present SOC value C2 is controlled to the target SOC value C1 by fuel power generation.

The SOC controller 100 has a function called "battery control" and a function called "charge control", in addition to the above functions, although not specifically illustrated. The following describes battery control. The battery or more specifically the lead acid battery of the embodiment has a predetermined available SOC range (operable SOC range) based on the need for prolonged life. Accordingly, the "battery control" is performed to increase the power of the engine 10 and thereby increase the SOC into the above SOC range when the SOC of the battery 40 becomes lower than a lower limit (for example, 60%) of this SOC range and to consume the SOC and thereby decrease the SOC into the above SOC range when the SOC exceeds an upper limit (for example, 90%) of the SOC range. When the SOC becomes lower than the lower limit during an engine stop by idle reduction control, the engine is restarted to increase the SOC into the above SOC range by fuel power generation.

The "charge control" is a control process that suppresses the battery from being charged by fuel power generation during normal running to save fuel consumption and charges the battery by regenerative power generation during deceleration running. The charge control is a known configuration and is thus not specifically described here, but basically performs the following operations. In the charge control, feedback control by the feedback controller 130 during normal running is performed when the target SOC value C1 is greater than the present SOC value C2; a specified power generation cutoff voltage is set to the voltage command value Sv, which is given to the alternator 35, when the target SOC value C1 is equal to or less than the present SOC value C2. This configuration suppresses charging during normal running and saves fuel consumption. The "normal running" herein denotes the state of the automobile 200 other than "vehicle stop" when the vehicle speed is 0 km/h and "deceleration running" when the regenerative power generation described above is performed.

C. Configuration of Target SOC Estimator

The target SOC estimator 110 includes a driving environment predictor 112, a vehicle state predictor 114, an SOC distribution request level calculator 116 and a target SOC calculator 118.

The driving environment predictor 112 predicts the driving environment of the vehicle. According to this embodiment, the "driving environment" shows whether a future (from now) vehicle driving area will be an urban area or a suburban area. The driving environment predictor 112 determines whether the driving environment up to now is an urban area or a suburban area based on the wheel speed Vh detected by the wheel speed sensor 82 and outputs the result of determination as an urban area/suburban area classification P1 of a future (from now) driving area. The urban area/suburban area classification P1 may take a value 1 in the case of an urban area and a value 0 in the case of a suburban area. The detailed procedure of determining whether the driving environment is an urban area or a suburban area will be described later in Chapter D.

The vehicle state predictor 114 predicts the state of the automobile 200 (vehicle state). The "vehicle state" herein is a parameter indicating how much SOC the automobile 200 is expected to consume hereafter. More specifically, the vehicle state predictor 114 calculates the amount of electric power consumed by the auxiliary machinery 70 based on the battery current Ab detected by the battery current sensor 88 and an alternator current Aa detected by the alternator current sensor 89 and outputs the calculated amount of electric power as a vehicle state P2. The SOC consumption rate increases with an increase in amount of electric power consumed by the auxiliary machinery 70. According to the embodiment, the vehicle state predictor 114 thus predicts the amount of electric power consumed by the auxiliary machinery 70 as the vehicle state P2.

The embodiment predicts the vehicle state P2 based on the amount of electric power consumed by the auxiliary machinery 70, but the invention is not limited to this configuration. For example, the vehicle state P2 may be predicted, based on air-conditioning information (for example, a difference between a target temperature and vehicle interior temperature) relating to the power consumption of the air-conditioner (A/C) or based on information regarding the engine warm-up state such as a difference between engine water temperature and ambient temperature. The invention is not limited to the configuration of predicting the vehicle state P2 based on one parameter selected among the amount of electric power consumed by the auxiliary machinery 70, the air-conditioning information and the warm-up state information, but may be implemented by a configuration that determines the vehicle state P2 based on two or more parameters. In the case of using two or more parameters, the application is preferably configured to predict the vehicle state P2 by multiplying the respective parameters by individual weighting factors.

Moreover, each of the configurations described above determines the current operating state of the auxiliary machinery based on the currently detected sensor signals and regards the current operating state as the future vehicle state. An alternative configuration may read a sign of change in operating state from the current operating state determined as described above, so as to predict the future vehicle state.

The driving environment predictor 112 and the vehicle state predictor 114 of the above configuration continually perform the predictions after the automobile 200 starts operation. The respective components 112 to 114 are actually implemented by the CPU included in the ECU 50 executing the computer programs stored in the ROM. The urban area/suburban area classification P1 predicted by the driving environment predictor 112 and the vehicle state P2 predicted by the vehicle state predictor 114 are sent to an SOC distribution request level calculator 116.

The SOC distribution request level calculator 116 calculates an SOC distribution request level P3 based on the urban area/suburban area classification P1 and the vehicle state P2. The target SOC calculator 118 calculates a target SOC value C1 based on the SOC distribution request level P3. The following describes the detailed processes of the SOC distribution request level calculator 116 and the target SOC calculator 118.

Figure 3:
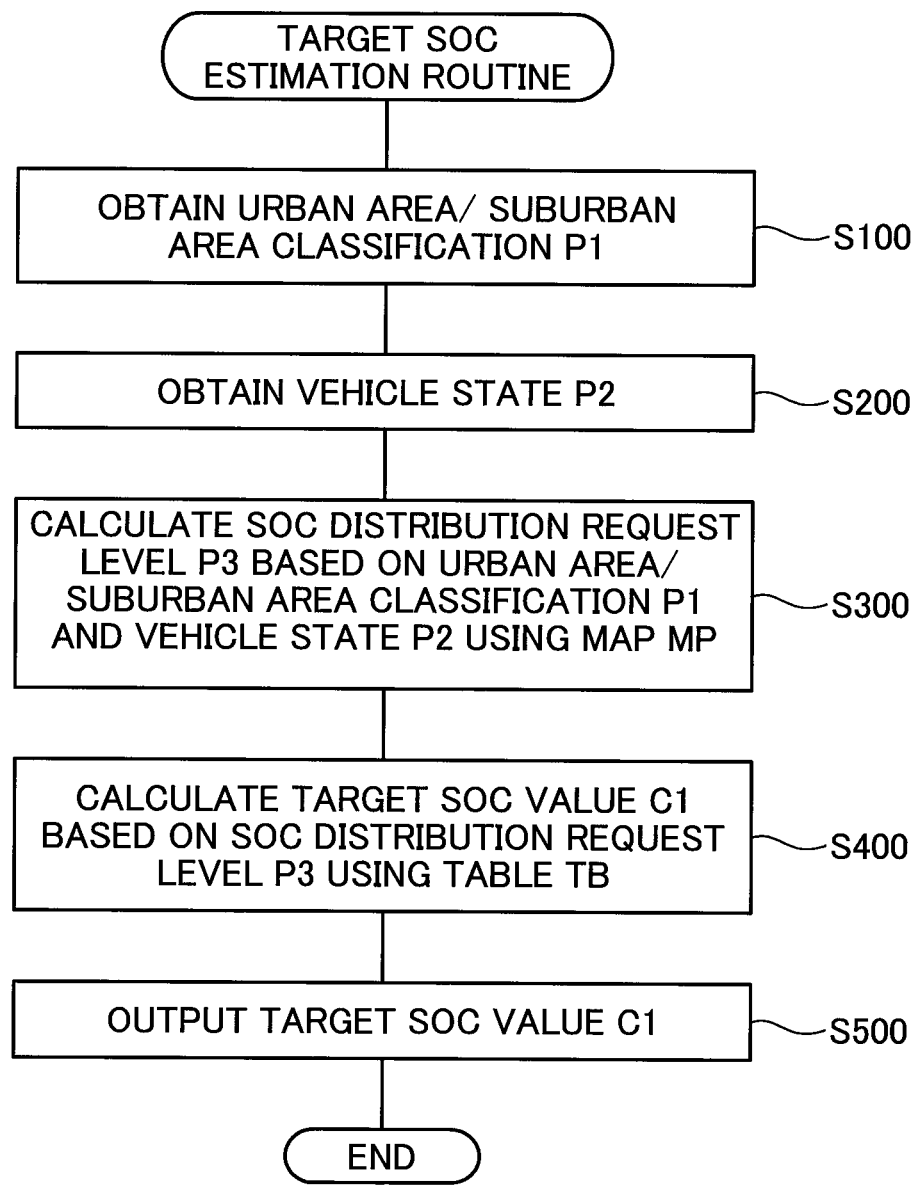
FIG. 3 is a flowchart showing a target SOC estimation routine.

FIG. 3 is a flowchart showing a target SOC estimation routine. This target SOC estimation routine is performed repeatedly at predetermined time intervals (for example, 60 sec) during vehicle running. In other words, the target SOC estimation routine is not performed during a stop of the engine 10 by idle reduction control. As illustrated, when the process flow starts, the CPU of the ECU 50 obtains the urban area/suburban area classification P1 predicted by the driving environment predictor 112 (FIG. 2) (step S100) and also obtains the vehicle state P2 predicted by the vehicle state predictor 114 (FIG. 2) (step S200).

After execution of step S200, the CPU calculates an SOC distribution request level based on the urban area/suburban area classification P1 and the vehicle state P2 by using an SOC distribution request level calculation map MP (step S300). The available SOC range is set for each type of battery as described above. The procedure of the embodiment distributes the available SOC range into an SOC range for idle reduction and an SOC range for charge control. The "SOC distribution request level" herein is a parameter specifying the level of the above distribution.

Figure 4:
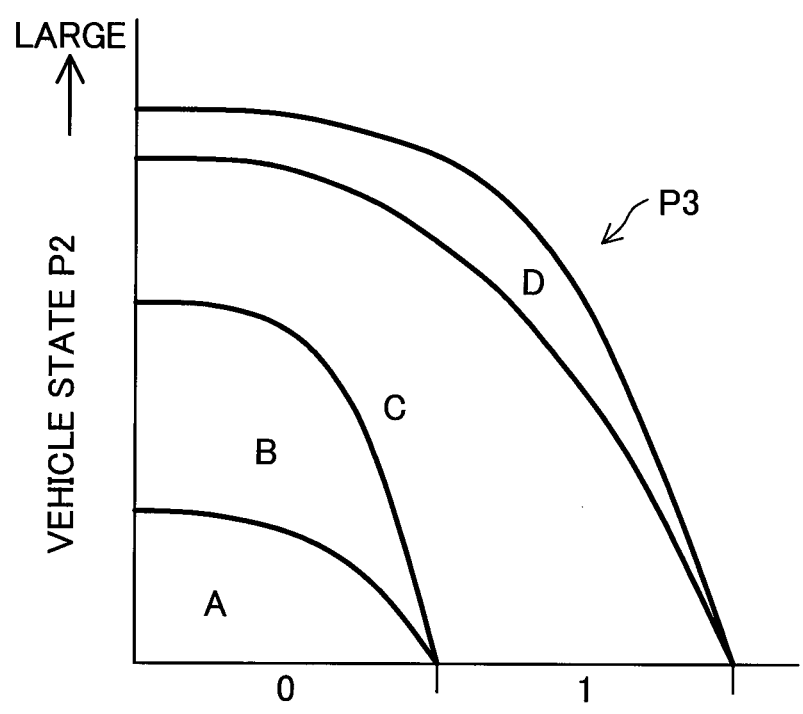
FIG. 4 is a diagram illustrating an SOC distribution request level calculation map MP.

FIG. 4 is a diagram illustrating the SOC distribution request level calculation map MP. As illustrated, the SOC distribution request level calculation map MP has the urban area/suburban area classification P1 as abscissa and the vehicle state P2 as ordinate and stores map data to map the SOC distribution request level P3 related to the value on the abscissa and the value on the ordinate. The SOC distribution request level calculation map MP is created by determining the relationship of the SOC distribution request level P3 to the urban area/suburban area classification P1 and the vehicle state P2 in advance experimentally or by simulation and is stored in the ROM. The process of step S300 reads the SOC distribution request level calculation map MP from the ROM and refers to this map MP to obtain the SOC distribution request level P3 related to the urban area/suburban area classification P1 obtained at step S100 and the vehicle state P2 obtained at step S200. In the illustrated example, four value, A, B, C and D are provided as the SOC distribution request level P3. The values descend in the order of D, C, B and A. The urban area/suburban area classification P1 equal to the value 1 representing the urban area has the higher SOC distribution request level P3, compared with the urban area/suburban area classification P1 equal to the value 0 representing the suburban area. Additionally, the SOC distribution request level P3 increases with an increase in vehicle state P2.

Referring back to FIG. 3, after execution of step S300, the CPU calculates the target SOC value C1 based on the SOC distribution request level P3 by using a target SOC calculation table TB (step S400).

Figure 5:
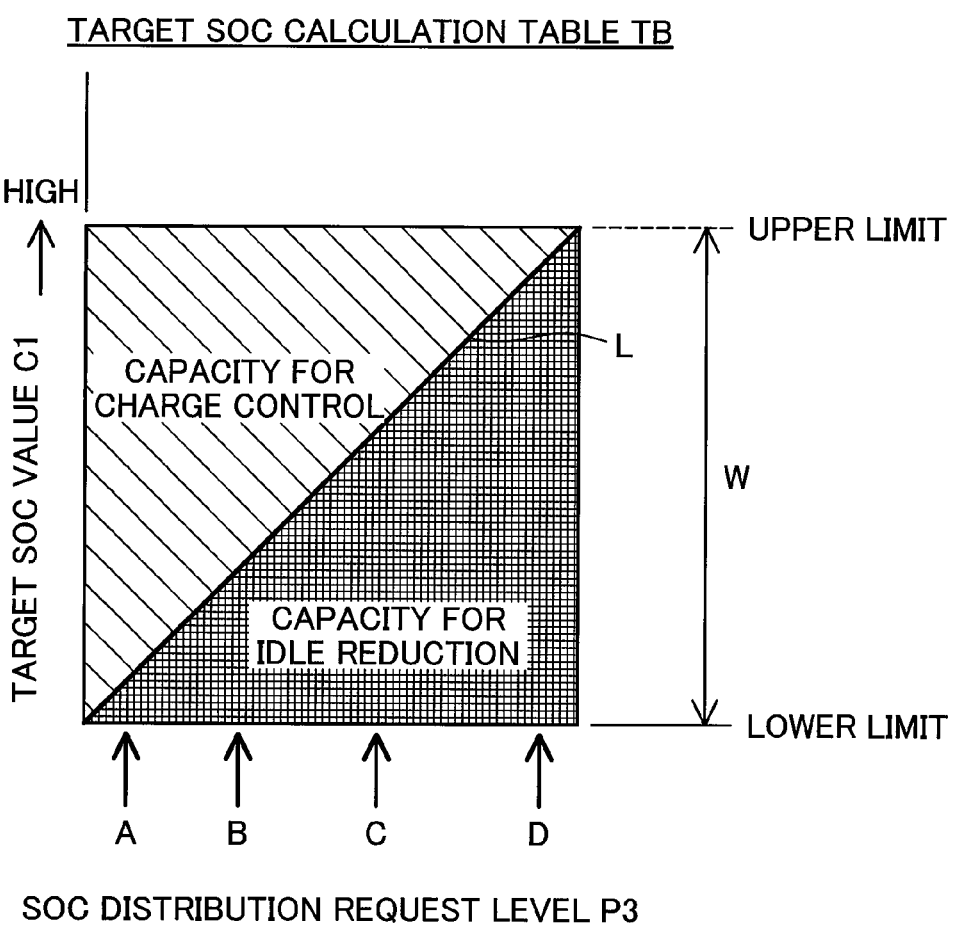
FIG. 5 is a diagram illustrating a target SOC calculation table TB.

FIG. 5 is a diagram illustrating the target SOC calculation table TB. As illustrated, the target SOC calculation table TB has the SOC distribution request level P3 as abscissa and the target SOC value C1 as ordinate and shows the relationship of the target SOC value C1 to the SOC distribution request level P3 by a linear line L. The target SOC calculation table TB is created by determining the relationship of the target SOC value C1 to the SOC distribution request level P3 in advance experimentally or by simulation and is stored in the ROM. The process of step S400 reads the target SOC calculation table TB from the ROM and refers to this table TB to obtain the target SOC value C1 related to the SOC distribution request level P3 calculated at step S300.

As illustrated, the target SOC value C1 shown by the linear line L is a value set in an available SOC range W of the battery 40 and indicates a distribution rate when the available SOC range W is distributed into a capacity for charge control and a capacity for idle reduction. More specifically, the area of the capacity for idle reduction is set on the lower side of the available SOC range W of the battery 40, and the area of the capacity for charge control is set on the upper side. The boundary between these two areas shows the target SOC value C1. In other words, the level determined by adding the capacity for idle reduction to the lower limit of the available SOC range W is set as the target SOC value C1.

The capacity for charge control is a battery capacity required due to suppression of fuel power generation by the charge control described above. The capacity for idle reduction is a capacity expected to be used in the future stop and start period. According to this embodiment, the capacity for idle reduction is set to an expected maximum capacity. The capacity for idle reduction increases with an increase in SOC distribution request level P3. When the SOC is controlled to the upper side of the linear line L, the remaining capacity corresponding to the SOC in the available SOC range exceeds the capacity for idle reduction. This causes the idle reduction control to be fully implemented and further has an excess corresponding to the exceeding capacity. The target SOC value C1 shown by the linear line L accordingly indicates the SOC that enables idle reduction control to be fully implemented hereafter and minimizes the amount of power generation for accumulation of SOC.

The target SOC value C1 linearly increases with an increase in SOC distribution request level P3 as shown by the linear line L. The invention is, however, not limited to this example. For example, the target SOC value C1 may be configured to linearly increase with an increase in SOC distribution request level P3 when the SOC distribution request level P3 is equal to or less than a predetermined value and to maintain a fixed value when the SOC distribution request level P3 is greater than the predetermined value. This configuration is effective for a battery having a relatively narrow available SOC range. Additionally, a change in target SOC value C1 may be shown by a curved line, instead of the linear line.

Referring back to FIG. 3, after execution of step S400, the CPU outputs the target SOC value C1 calculated at step S400 to the feedback controller 130 (step S500) and subsequently terminates the target SOC estimation routine. The feedback controller 130 (FIG. 2) controls the present SOC value C2 to the calculated target SOC value C1. The present SOC value C2 indicates the remaining capacity in the available SOC range of the battery 40. The control described above results in avoiding the remaining capacity from becoming less than the capacity for idle reduction during vehicle running. More specifically, when the present SOC value is located in the area of the capacity for charge control in FIG. 5, i.e., when the remaining capacity is greater than the capacity for idle reduction, charge control is performed to suppress the battery 40 from being charged by fuel power generation. When the SOC decreases and is becoming less than the capacity for idle reduction, the SOC is controlled to the target SOC value C1 shown by the linear line L by fuel power generation. Such control accordingly prevents the SOC from becoming less than the capacity for idle reduction.

Figure 6:
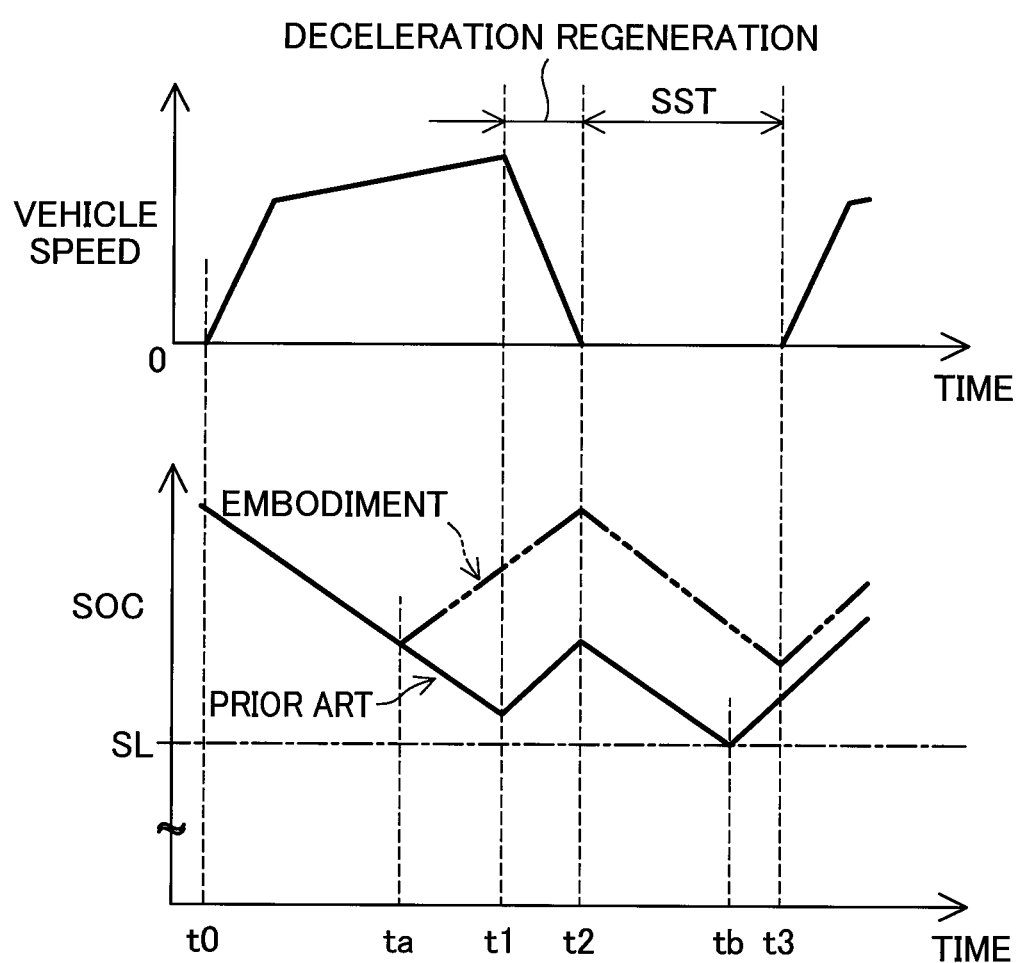
FIG. 6 is a diagram illustrating time charts of vehicle speed and SOC during operation of the automobile.

FIG. 6 is a diagram illustrating time charts of vehicle speed and SOC (present SOC value C2) of the battery 40 during operation of the automobile 200. The time charts have the vehicle speed and the SOC as the ordinate and the time as the abscissa. When the operation of the automobile 200 is started and the automobile 200 starts moving at a time t0, the vehicle speed gradually increases to normal running. The vehicle then shifts to the deceleration state at a time t1. In a t0-t1 period from the time t0 to the time t1, the SOC gradually decreases as shown by the solid line. This solid line, however, indicates a change according to the prior art, and this embodiment has a change as shown by the two-dot chain line. This is described below.

After the time t1, the vehicle stops at a time t2. In a t1-t2 period, the SOC gradually increases as shown by the solid line by regenerative power generation during deceleration. A period from the time t2 (more specifically, at the time when the engine stop condition is satisfied) to a time t3 when the vehicle speed has a rise is a stop and start period SST, when the engine 10 is at stop. In the stop and start period SST, the SOC gradually decreases by power consumption of the auxiliary machinery. According to the prior art, as shown by the solid line, when the SOC decreases to a lower limit SL during this engine stop (time tb), battery control is performed to restart the engine 10. After the engine restart, the SOC increases by power generation using the power of the engine 10, as shown by the solid line.

According to the embodiment, when the SOC decreases during normal running and causes the remaining capacity in the available SOC range of the battery 40 to become less than the capacity for idle reduction (time ta), the SOC is increased by fuel power generation. As shown by the two-dot chain line in illustration, the SOC increases in a ta-t2 period. This increase is in view of the maximum battery capacity expected to be used in the future stop and start period, so that the SOC decreasing in the stop and start period t2-t3 does not reach the lower limit SL. The "future stop and start period" is not limited to one stop and start period SST as illustrated but includes all a plurality of stop and start periods within a predetermined time period. According to the embodiment, the engine 10 is restarted in the state that the SOC does not decrease to the lower limit in the stop and start period t2-t3, unlike the prior art.

D. Driving Environment Prediction Method

Figure 7:
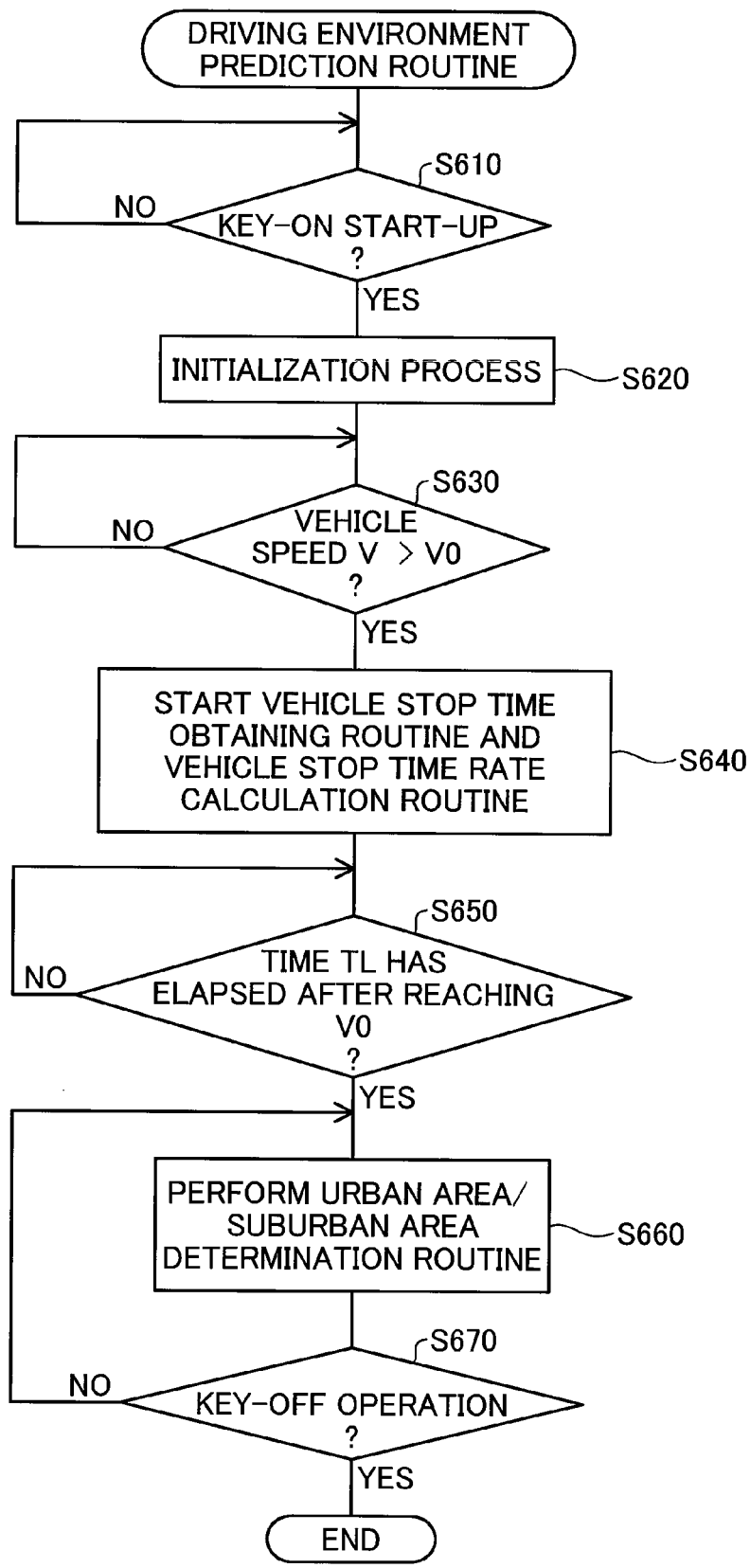
FIG. 7 is a flowchart showing a driving environment prediction routine.

FIG. 7 is a flowchart showing a driving environment prediction routine. The CPU of the ECU 50 executes the driving environment prediction routine to implement the driving environment predictor 112 (FIG. 2). As illustrated, when the process flow starts, the CPU of the ECU 50 first determines whether key-on start-up is performed (step S610). Herein "key-on start-up" means that the engine is started by the driver's operation of an ignition key (not shown). When it is determined that no key-on start-up is performed at step S610, the process flow repeats the determination of step S610 and waits for key-on start-up. When key-on start-up is performed, the CPU performs an initialization operation to clear storage stacks and variables described later (step S620).

The CPU subsequently specifies the wheel speed Vh detected by the wheel speed sensor 82 as the vehicle speed V and determines whether the vehicle speed V is higher than a predetermined speed V0 (for example, 15 km/h) (step S630). When the vehicle speed V is equal to or lower than V0, the CPU waits until the vehicle speed V exceeds V0 and then proceeds to step S640. Instead of using the detected value of the wheel speed sensor 82, the detected value of a vehicle speed sensor (not shown) may be used as the vehicle speed. At step S640, the CPU starts a vehicle stop time obtaining routine and a vehicle stop time rate calculation routine described below.

Figure 8:
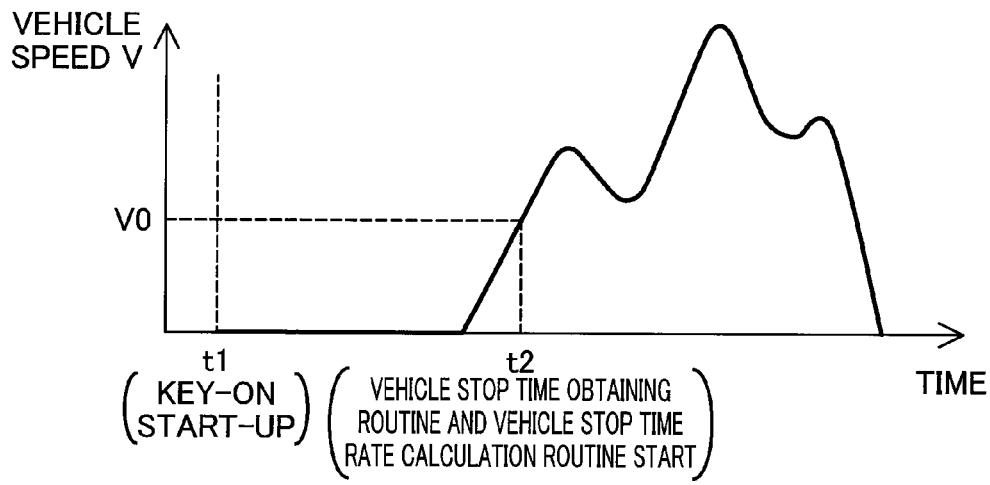
FIG. 8 is a diagram illustrating a time chart showing the relationship between vehicle speed V and start time of a vehicle stop time obtaining routine and a vehicle stop time rate calculation routine.

FIG. 8 is a diagram illustrating a time chart showing the relationship between the vehicle speed V and the start time of the vehicle stop time obtaining routine and the vehicle stop time rate calculation routine. The time chart has the time t as abscissa and the vehicle speed V as the ordinate. As illustrated, key-on start-up is performed at a time t1, and the vehicle speed keeps 0 km/h for a predetermined time period from the key-on start-up, because of reasons like catalyst warm-up. The vehicle speed V subsequently has a rise and reaches a specified speed V0 at a time t2, when the vehicle stop time obtaining routine and the vehicle stop time rate calculation routine are started. This configuration is for the purpose of not counting a period (t1-t2) from the key-on start-up time to the time when the vehicle speed V reaches the specified speed V0 as a vehicle stop time obtained by the vehicle stop time obtaining routine.

Referring back to FIG. 7, after execution of step S640, the CPU determines whether a start restriction time (TL described later) has elapsed after the vehicle speed V reaches V0 (step S650). The CPU waits for elapse of the start restriction time TL and performs an urban area/suburban area determination routine described later (step S660). After execution of step S660, the CPU determines whether the driver switches off the ignition key (step S670). The process flow repeats step S660 until the driver's key-off operation. In response to the driver's key-off operation, the CPU terminates this driving environment prediction routine.

Figure 9:
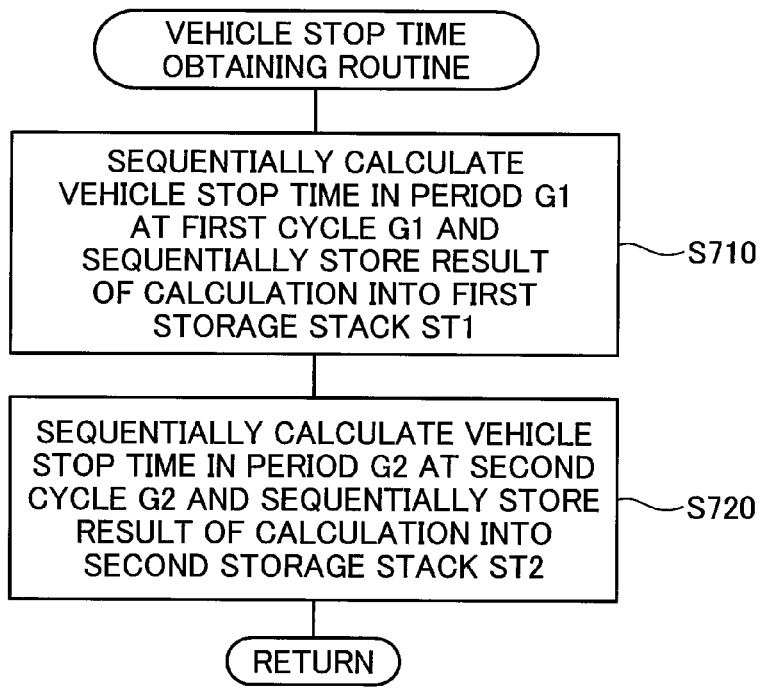
FIG. 9 is a flowchart showing the vehicle stop time obtaining routine.

FIG. 9 is a flowchart showing the vehicle stop time obtaining routine started at step S640. When the process flow starts, the CPU repeatedly performs a vehicle stop time obtaining process described below at a first cycle G1 (step S710). This vehicle stop time obtaining process calculates a vehicle stop time in a period of the first cycle G1 and stores the calculated vehicle stop time into a first storage stack ST1. The first cycle G1 is 60 [sec].

Figure 10:
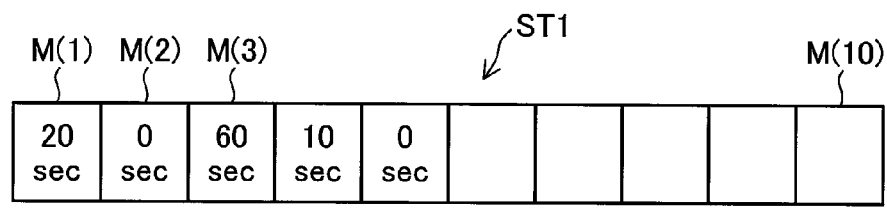
FIG. 10 is a diagram illustrating one example of a first storage stack ST1.

FIG. 10 is a diagram illustrating one example of the first storage stack ST1. As illustrated, the first storage stack ST1 consists of ten stack elements M(1), M(2), ..., M(10). At step S710, the CPU calculates the vehicle stop time within 60 seconds at every 60 seconds and sequentially stores the results of calculation into the stack elements M(n) of the first storage stack ST1, where n represents variables from 1 to 10 and the stack element M(n) in which the result of calculation is stored shifts from M(1) to M(10). The procedure of calculating the vehicle stop time determines whether the vehicle is at stop (Vh=0 km/h) based on the wheel speed Vh detected by the wheel speed sensor 82 and measures the vehicle stop time over the period of the first cycle G1. Instead of using the detected value of the wheel speed sensor 82, the detected value of a vehicle speed sensor (not shown) may be used to determine whether the vehicle is at stop.

Figure 11:
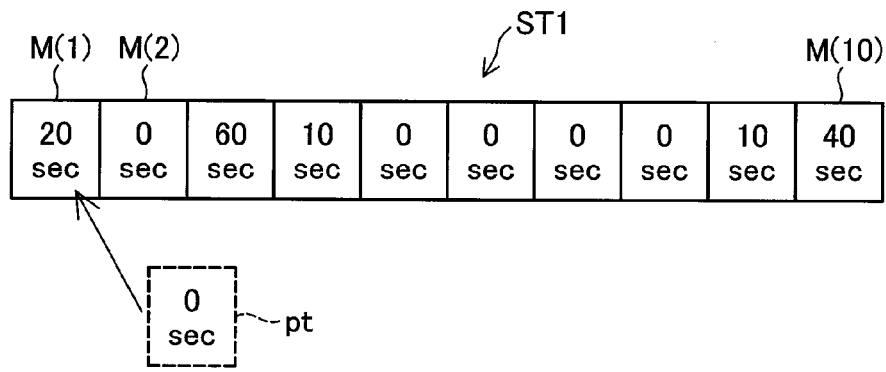
FIG. 11 is a diagram illustrating a change in storage of the first storage stack ST1.

More specifically, at step S710, the CPU sequentially calculates the vehicle stop time during the period of 60 seconds at the cycle of 60 seconds and sequentially stores the calculated vehicle stop time one by one into the stack elements M(1) to M(10). In the illustrated example, after elapse of 60 seconds, the vehicle stop time of 20 seconds is stored into the stack element M(1); after elapse of 120 seconds, the vehicle stop time of 0 second is stored into the stack element M(2); and after elapse of 180 seconds, the vehicle stop time of 60 seconds is stored into the stack element M(3). In this way, the vehicle stop time is sequentially stored at the cycle of 60 seconds. As shown in FIG. 11, when the storage of the vehicle stop time occupies the last stack element M(10), i.e., when the total of 10 minutes (600 seconds) have elapsed, a vehicle stop time pt calculated in a next cycle is stored in the first stack element M(1). At this moment, the existing storages are kept in the other stack elements M(2) to M(10). A vehicle stop time (not shown) calculated in a next cycle is stored in the second stack element M(2). In this manner, when all the stack elements M(1) to M(10) have been occupied, the storages in the stack elements have sequentially been updated one by one from the top.

Referring back to FIG. 9, the CPU repeatedly performs a vehicle stop time obtaining process described below at a second cycle G2 (step S720). This vehicle stop time obtaining process calculates a vehicle stop time in a period of the second cycle G2 and stores the calculated vehicle stop time into a second storage stack ST2. The second cycle G2 is 90 [sec]. Although the process of step S720 is illustrated as if subsequent to step S710, this is for convenience of illustration. Actually, like the process of step S710 described above, the process of step S720 is performed immediately after start of the vehicle stop time obtaining routine. In other words, the process of step S710 and the process of step S720 are performed in parallel by time sharing.

Figure 12:
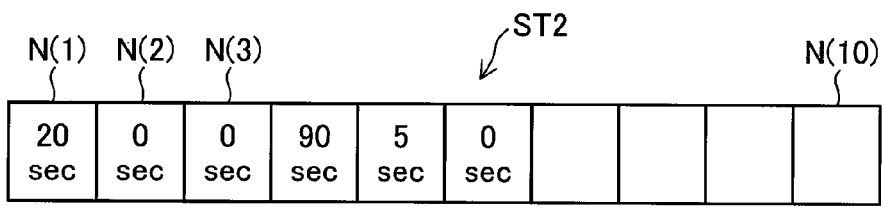
FIG. 12 is a diagram illustrating one example of a second storage stack ST2.

FIG. 12 is a diagram illustrating one example of the second storage stack ST2. As illustrated, the second storage stack ST2 consists of ten stack elements N(1), N(2), ..., N(10). At step S720, the CPU calculates the vehicle stop time within 90 seconds at every 90 seconds and sequentially stores the results of calculation into the stack elements N(n) of the second storage stack ST2, where n represents variables from 1 to 10 and the stack element N(n) in which the result of calculation is stored shifts from N(1) to N(10). The procedure of calculating the vehicle stop time detects a vehicle stop based on the wheel speed Vh detected by the wheel speed sensor 82 as described above and measures the vehicle stop time over a period of the second cycle G2.

More specifically, at step S720, the CPU sequentially calculates the vehicle stop time during the period of 90 seconds at the cycle of 90 seconds and sequentially stores the calculated vehicle stop time one by one into the stack elements N(1) to N(10). In the illustrated example, after elapse of 90 seconds, the vehicle stop time of 20 seconds is stored into the stack element N(1); after elapse of 180 seconds, the vehicle stop time of 0 second is stored into the stack element N(2); and after elapse of 270 seconds, the vehicle stop time of 0 second is stored into the stack element N(3). In this way, the vehicle stop time is sequentially stored at the cycle of 90 seconds. When the storage of the vehicle stop time occupies the last stack element N(10), i.e., when the total of 15 minutes (900 seconds) have elapsed, the storages in the stack elements have sequentially been updated one by one from the top, like the first storage stack ST1.

Figure 13:
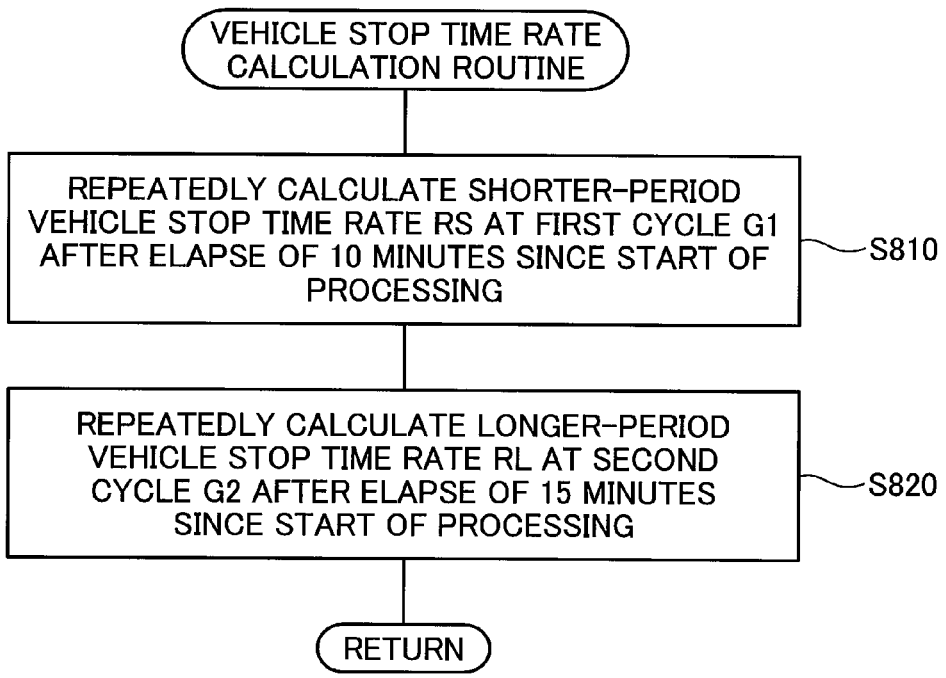
FIG. 13 is a flowchart showing the vehicle stop time rate calculation routine.

FIG. 13 is a flowchart showing the vehicle stop time rate calculation routine started at step S640 (FIG. 7). When the process flow starts, the CPU repeatedly calculates a shorter-period vehicle stop time rate RS at the first cycle G1 after elapse of 10 minutes since the start of processing (step S810). More specifically, the CPU calculates the total value of the respective values stored in the stack elements M(1) to M(10) of the first storage stack ST1, divides the calculated total value by 600 seconds which is the time required to occupy the first storage stack ST1, and specifies the quotient as a shorter-period vehicle stop time rate RS. In the first storage stack ST1, the stack elements M(n) are updated one by one at every 60 seconds which is the first cycle G1, so that the shorter-period vehicle stop time rate RS is calculated at every update. In other words, the process of step S810 uses the storage of the first storage stack ST1 to determine the rate of the vehicle stop time in the last 600 seconds as the shorter-period vehicle stop time rate RS. The rate of the vehicle stop time denotes the rate of the vehicle stop time to the total time (600 seconds in this case).

The CPU also repeatedly calculates a longer-period vehicle stop time rate RL at the second cycle G2 after elapse of 15 minutes since the start of processing (step S820). Although the process of step S820 is illustrated as if subsequent to step S810, this is for convenience of illustration. Actually, like the process of step S810 described above, the process of step S820 is performed immediately after start of the vehicle stop time rate calculation routine. In other words, the process of step S810 and the process of step S820 are performed in parallel by time sharing.

At step S820, more specifically, the CPU calculates the total value of the respective values stored in the stack elements N(1) to N(10) of the second storage stack ST2, divides the calculated total value by 900 seconds which is the time required to occupy the second storage stack ST2, and specifies the quotient as a longer-period vehicle stop time rate RL. In the second storage stack ST2, the stack elements N(n) are updated one by one at every 90 seconds which is the second cycle G2, so that the longer-period vehicle stop time rate RL is calculated at every update. In other words, the process of step S820 uses the storage of the second storage stack ST2 to determine the rate of the vehicle stop time in the last 900 seconds as the longer-period vehicle stop time rate RL. The rate of the vehicle stop time denotes the rate of the vehicle stop time to the total time (900 seconds in this case). The time required to occupy the second storage stack ST2, i.e., 900 seconds, corresponds to the start restriction time TL at step S650 described above.

The shorter-period vehicle stop time rate RS corresponds to the "first vehicle stop time rate" described in [Solution to Problem]. The longer-period vehicle stop time rate RL corresponds to the "second vehicle stop time rate" described in [Solution to Problem]. The ECU 50 and the vehicle stop time obtaining routine and the vehicle stop time rate calculation routine performed by the CPU of the ECU 50 correspond to the "first vehicle stop time rate calculator" and the "second vehicle stop time rate calculator" described in [Solution to Problem].

As described above, the shorter-period vehicle stop time rate RS is calculated after elapse of 10 minutes since the start of processing, and the longer-period vehicle stop time rate RL is calculated after elapse of 15 minutes since the start of processing. This configuration provides a period of suspension before determination of the respective first values respectively using the first storage stack ST1 and the second storage stack ST2. This period of suspension may be set to a predetermined initial value needed by the system.

Figure 14:
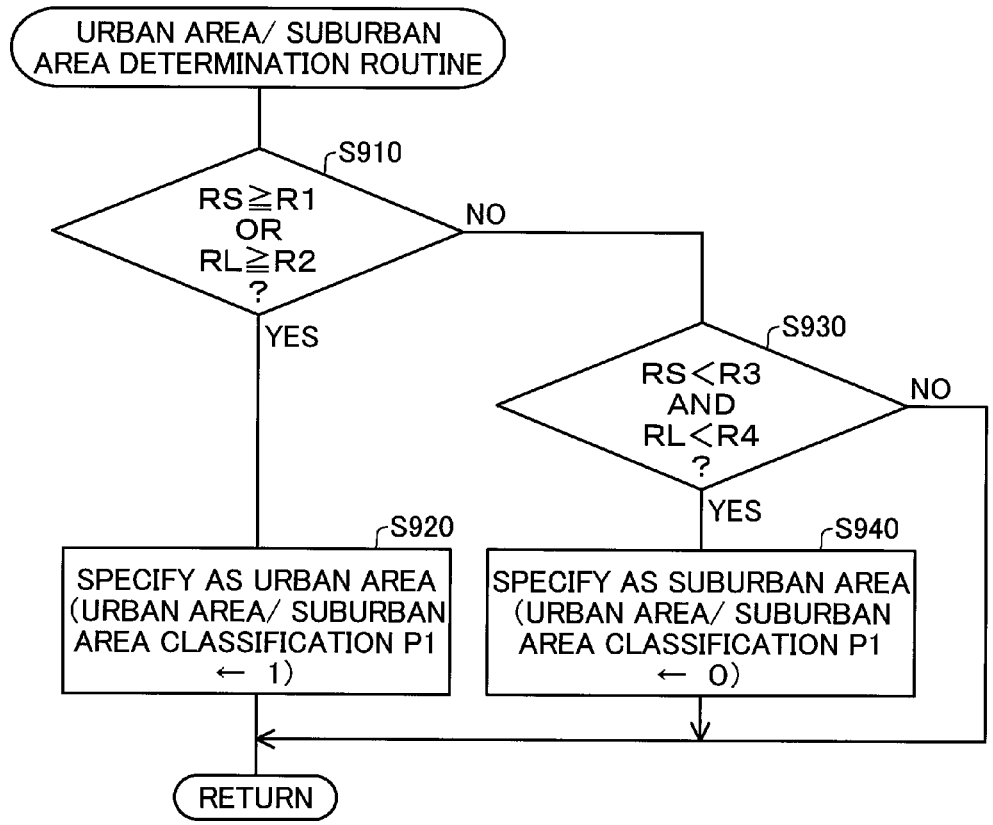
FIG. 14 is a flowchart showing an urban area/suburban area determination routine.

FIG. 14 is a flowchart showing the urban area/suburban area determination routine performed at step S660 (FIG. 7). This urban area/suburban area determination routine determines whether the driving environment is an urban area or a suburban area, based on the latest shorter-period vehicle stop time rate RS and the latest longer-period vehicle stop time rate RL calculated in the vehicle stop time rate calculation routine. Accordingly, the ECU 50 and the urban area/suburban area determination routine performed by the CPU of the ECU 50 correspond to the "driving environment predictor" described in [Solution to Problem].

As illustrated, when the process flow starts, the CPU determines whether at least one of conditions is satisfied, i.e., the shorter-period vehicle stop time rate RS is equal to or higher than a first reference value R1 and the longer-period vehicle stop time rate RL is equal to or higher than a second reference value R2 (step S910). There is a relationship of R1>R2 between the first reference value R1 and the second reference value R2. For example, R1 is 48% and R2 is 44%. Upon determination that at least one of the conditions is satisfied at step S910, the driving environment is specified as an urban area (step S920). More specifically, a value 1 is set to the urban area/suburban area classification P1. After execution of step S920, the CPU goes to "Return" and terminates this routine.

Upon determination that neither of the above two conditions is satisfied at step S910, on the other hand, the CPU subsequently determines whether both conditions are satisfied, i.e., the shorter-period vehicle stop time rate RS is less than a third reference value R3 and the longer-period vehicle stop time rate RL is less than a fourth reference value R4 (step S930). There is a relationship of R1>R3 between the third reference value R3 and the above first reference value R1. There is also a relationship of R2>R4 between the fourth reference value R4 and the above second reference value R2. For example, R3 is 42% and R4 is 40%. Furthermore, there is a relationship of R3>R4 between the third reference value R3 and the fourth reference value R4. In other words, there is a relationship of R1>R2>R3>R4 according to the embodiment.

Upon determination that both the conditions are satisfied at step S930, the driving environment is specified as a suburban area (step S940). More specifically, a value 0 is set to the urban area/suburban area classification P1. After execution of step S940, the CPU goes to "Return" and terminates this routine. In the case of negative answer at step S930, i.e., upon determination that at least one of the conditions is not satisfied, the CPU immediately goes to "Return" and terminates this routine. In other words, in the case of negative answer at step S930, the CPU keeps unchanged the value of the urban area/suburban area classification P1 set in the previous cycle and terminates this routine.

The algorithm according to the urban area/suburban area determination routine configured as described above determines whether the driving environment is an urban area or a suburban area, based on the shorter-period vehicle stop time rate RS and the longer-period vehicle stop time rate RL. The following described the reason of configuration of this algorithm.

Figure 15:
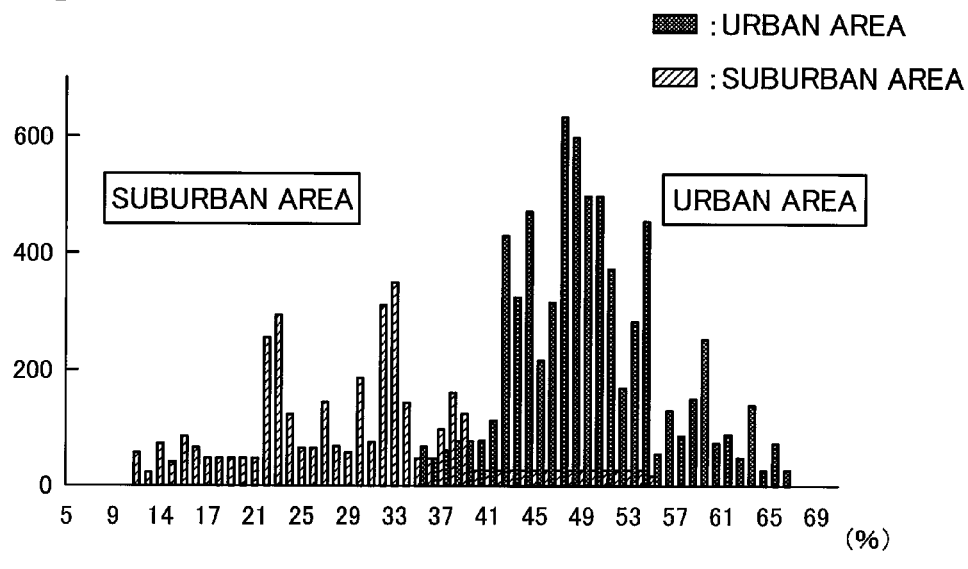
FIG. 15 is a graph showing frequency distributions of a shorter-period vehicle stop time rate RS in the urban area and in the suburban area.
Figure 16:
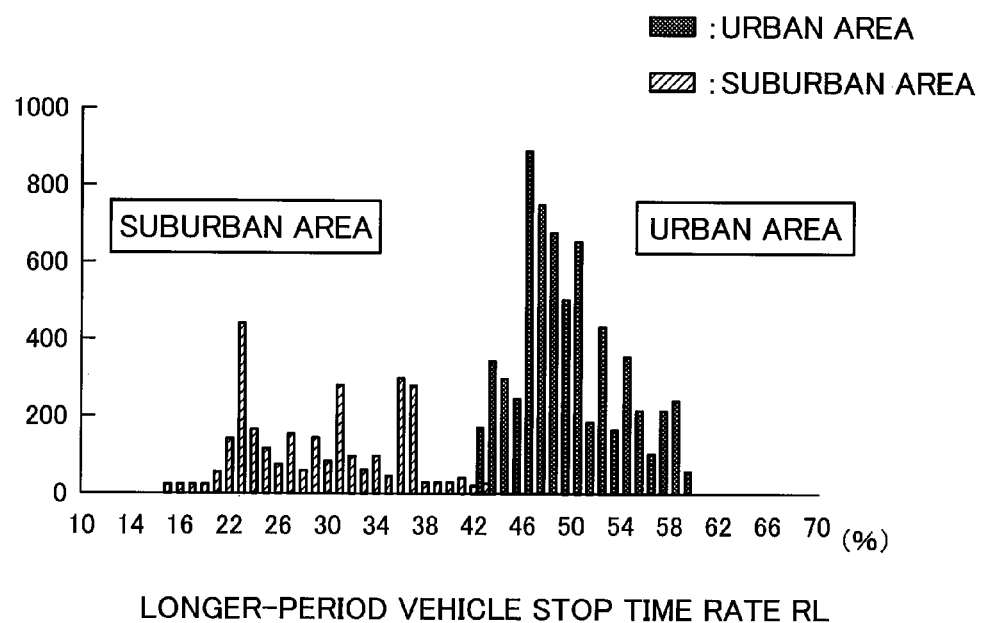
FIG. 16 is a graph showing frequency distributions of a longer-period vehicle stop time rate RL in the urban area and in the suburban area.

FIG. 15 is a graph showing frequency distributions of the shorter-period vehicle stop time rate RS in the urban area and in the suburban area. FIG. 16 is a graph showing frequency distributions of the longer-period vehicle stop time rate RL in the urban area and in the suburban area. These graphs are created by actually driving automobiles in urban areas and in suburban areas and calculating the shorter-period vehicle stop time rate RS and the longer-period vehicle stop time rate RL. As shown in FIG. 15, in the distribution of the shorter-period vehicle stop time rate RS, both suburban areas and urban areas are included in the range of 35 to 53%. In the distribution of the longer-period vehicle stop time rate RL, on the other hand, suburban areas are separated from urban areas at about 42% as the boundary. According to these results, the determination based on the shorter-period vehicle stop time rate RS requires the shorter period of 10 minutes and has the better responsiveness but the lower accuracy. The determination based on the longer-period vehicle stop time rate RL, on the other hand, requires the longer period of 15 minutes and has the worse responsiveness but the higher accuracy.

The urban area/suburban area determination routine described above uses a relatively high value of 48% in the above mixed range (35 to 53%) as the reference value of the shorter-period vehicle stop time rate RS at step S910 and is thus capable of specifying an approach into an urban area with high responsiveness. The urban area/suburban area determination routine, on the other hand, uses a value of 40% that is slightly lower than 42%, at which urban areas are clearly separated from suburban areas, as the reference value of the longer-period vehicle stop time rate RL at step S930 and is thus capable of specifying an approach into a suburban area with high accuracy. The determination with regard to the longer-period vehicle stop time rate RL at step S910 and the determination with regard to the shorter-period vehicle stop time rate RS at step S930 are added, with a view to enhancing the accuracy of determination.

Figure 17:
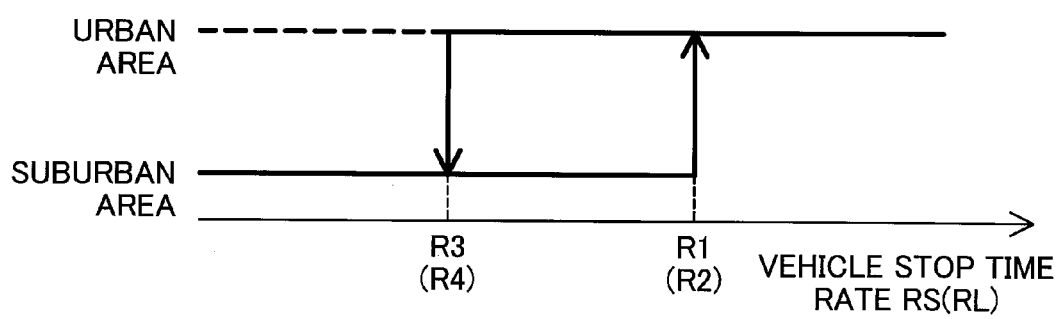
FIG. 17 is a diagram showing the relationship between a reference value (R1, R2) for specifying a change from a suburban area to an urban area and a reference value (R3, R4) for specifying a change from an urban area to a suburban area.

Additionally, in the urban area/suburban area determination routine described above, as shown in FIG. 17, the reference value (R1, R2) for specifying a change from a suburban area to an urban area is not identical with the reference value (R3, R4) for specifying a change from an urban area to a suburban area, but there is a certain difference between them. This prevents hunting of the result of determination.

E. Advantageous Effects of Embodiment

The automobile 200 configured as described above determines whether the current driving environment is an urban area or a suburban area, based on the shorter-period vehicle stop time rate RS calculated in the shorter period of 10 minutes and the longer-period vehicle stop time rate RL calculated in the longer period of 15 minutes and predicts the future driving environment on the assumption that the result of determination is applied to the future driving area. This prediction achieves both the responsiveness and the accuracy as described previously. Additionally, this does not need any complicated configuration like an automotive navigation system but needs only the simple device configuration.

The embodiment is configured not to perform calculation of the vehicle stop time rate in the period from the key-on start-up time to the time when the vehicle speed reaches the specified speed V0. The calculated vehicle stop time rates are thus effectively used in the system of idle reduction control. The idle reduction control does not allow for idle reduction in the initial stage of a vehicle start-up because of reasons like catalyst-warm-up. Exclusion of the above period from calculation of the vehicle stop time rate ensures the adequate control.

According to the embodiment, as shown in FIG. 6, the engine 10 is not restarted in the state that the SOC decreases to the lower limit in the stop and start period t2-t3. An engine restart due to shortage of SOC in the middle of the stop and start period requires three times to even five times the amount of fuel required in the case of an increase in power during operation of the engine to increase the SOC. In other words, the fuel consumption effect per unit SOC (for example, 1% SOC) during engine operation is three times to five times better than that in the case of an engine restart due to shortage of SOC in the middle of the stop and start period. The automobile 200 of the embodiment accordingly has the advantageous effect of improving the fuel consumption, compared with the prior art.

Additionally, this embodiment determines the SOC distribution request level P3 based on the urban area/suburban area classification P1 (FIG. 4), which is set to achieve both the responsiveness and the accuracy according to the urban area/suburban area determination routine, and determines the capacity for idle reduction based on the SOC distribution request level P3 (FIG. 5). This enables the capacity for idle reduction to be adequately determined in the available SOC range W of the battery 40.

More specifically, the embodiment specifies the driving environment as an urban area, when the shorter-period vehicle stop time rate RS is equal to or higher than the first reference value R1 (condition 1). In the case of an urban area (i.e., when the urban area/suburban area classification P1="1"), the SOC distribution request level P3 increases, and the capacity for idle reduction is set to a greater value than the capacity set when the condition 1 is not satisfied (in the case of a suburban area). The embodiment also specifies the driving environment as an urban area, when the longer-period vehicle stop time rate RL is equal to or higher than the second reference value R2 (condition 2). In the case of an urban area, the SOC distribution request level P3 increases, and the capacity for idle reduction is set to a greater value than the capacity set when the condition 2 is not satisfied (in the case of a suburban area). These results in more adequately determining the capacity for idle reduction.

Additionally, the embodiment specifies the driving environment as a suburban area, when the shorter-period vehicle stop time rate RS is less than the third reference value R3 and when the longer-period vehicle stop time rate RL is less than the fourth reference value R4 (condition 3). In the case of a suburban area, the SOC distribution request level P3 decreases, and the capacity for idle reduction is set to a smaller value than the capacity set when the condition 3 is not satisfied (in the case of an urban area). In other words, when the shorter-period vehicle stop time rate RS is less than the third reference value R3 and when the longer-period vehicle stop time rate RL is less than the fourth reference value R4, the capacity for charge control is set to a greater value than the capacity set when this condition is not satisfied. These result in more adequately determining the capacity for charge control and thereby adequately determining the capacity for idle reduction.

The embodiment accordingly enables the capacity for idle reduction to be adequately determined and thus effectively prevents the engine 10 from being restarted in the state that the SOC reaches the lower limit in the stop and start period t2-t3. The automobile 200 of the embodiment thus further improves the fuel consumption.

F. Modifications

The present invention is not limited to the embodiment or aspects described above but may be implemented by various other aspects within the scope of the invention. Some examples of possible modifications are given below.

Modification 1

The above embodiment is configured to determine the SOC distribution request level P3 based on the urban area/suburban area classification P1 and the vehicle state P2 and calculate the target SOC based on the SOC distribution request level P3. Alternatively, the configuration may be modified to directly calculate the target SOC, based on the urban area/suburban area classification P1 and the vehicle state P2. More specifically, the configuration may be modified to directly calculate a distribution ratio of the available SOC range of the battery to the capacity for charge control and the capacity for idle reduction, based on the urban area/suburban area classification P1 and the vehicle state P2.

Modification 2

The above embodiment calculates the SOC distribution request level based on both the urban area/suburban area classification P1 and the vehicle state P2. Alternatively, the configuration may be modified to calculate the SOC distribution request level based on only the urban area/suburban area classification P1.

Modification 3

The above embodiment and modifications 1 and 2 determine whether the driving environment of the vehicle is an urban area or a suburban area. The invention is, however, not limited to this configuration. The configuration may be modified to determine an index, which may take three or more values as the degree of urbanization, instead of the two values of urban area and suburban area. In this modification, the shorter-period vehicle stop time rate RS and the longer-period vehicle stop time rate RL should respectively be compared with two or more reference values.

Modification 4

In the above embodiment, the first to the fourth reference values R1 to R4 are respectively set to 48%, 44%, 42% and 40%. These values are only illustrative and may be changed to other values according to the invention. The respective reference values R1 to R4 are not necessarily fixed values but may be varied according to the remaining amount of fuel and the remaining charge of the battery.

Modification 5

The above embodiment and modifications 1 to 4 predict the driving environment by comparing the shorter-period vehicle stop time rate RS and the longer-period vehicle stop time rate RL with the reference values. The invention is, however, not limited to this configuration. For example, the driving environment may be predicted, based on a change in shorter-period vehicle stop time rate RS and a change in longer-period vehicle stop time rate RL. In general, any configuration may be employed to predict the driving environment based on the shorter-period vehicle stop time rate RS and the longer-period vehicle stop time rate RL.

Modification 6

The above embodiment and modifications 1 to 5 determine the classification between urban area and suburban area or the degree of urbanization as the driving environment of the vehicle. The invention is, however, not limited to this configuration. The driving environment of the vehicle may be the degree of traffic congestion or may be any parameter including a factor that causes a stop of the vehicle (vehicle stop).

Modification 7

The above embodiment and modifications 1 to 6 are configured to predict the driving environment of the vehicle. The vehicle control device of the invention is not necessarily configured to predict the driving environment. For example, the configuration may be modified to directly set the capacity for idle reduction, based on the shorter-period vehicle stop time rate RS and the longer-period vehicle stop time rate RL.

Modification 8

The above embodiment specifies the driving environment as an urban area when at least one of the following conditions is satisfied, i.e., the shorter-period vehicle stop time rate RS is equal to or higher than R1 and the longer-period vehicle stop time rate RL is equal to or higher than R2 according to the urban area/suburban area determination routine (FIG. 14). The invention is, however, not limited to this configuration. The configuration may be modified to specify the driving environment as an urban area only when it is determined that RS is equal to or higher than R1. In this modification, the longer-period vehicle stop time rate RL may be used to specify whether the driving environment is a suburban area. More specifically, for example, the configuration may be modified to change the determination of step S910 in FIG. 14 to the determination of RS R1 and change the determination of step S930 to the determination of RL<R4. This modification enables the driving environment to be predicted with achieving both the responsiveness and the accuracy by the simple configuration.

Modification 9

The above embodiment predicts the driving environment, based on the shorter-period vehicle stop time rate RS and the longer-period vehicle stop time rate RL. Alternatively, the configuration of the invention may be modified to predict the driving environment, based on one vehicle stop time rate, i.e., a rate of vehicle stop time in a predetermined period.

Modification 10

In the above embodiment, the battery is a lead acid battery. The invention is, however, not limited to this type of battery but may be applied to any of various other types of batteries, such as lithium ion battery and rocking chair-type battery. In the above embodiment, the vehicle is an automobile. Alternatively the invention may be applied to a vehicle other than automobile, such as train.

Modification 11

Part of the functions configured by the software in the above embodiment may be configured by hardware (for example, integrated circuit), or part of the functions configured by the hardware may be configured by software.

Modification 12

Among components in the embodiment and the respective modifications described above, components other than those described in independent claims are additional components and may be omitted as appropriate. For example, a modification may omit charge control which suppresses the battery from being charged during normal running to save the amount of fuel consumption and charges the battery by regenerative power generation during deceleration running.

REFERENCE SIGNS LIST

10 Engine
15 Automatic transmission
20 Differential gear
25 Drive wheels
30 Starter
34 Drive mechanism
35 Alternator
40 Battery
50 ECU
70 Auxiliary machinery
72 Headlights
74 Air conditioner
82 Wheel speed sensor
84 Brake pedal sensor
86 Accelerator opening sensor
88 Battery current sensor
89 Alternator current sensor
90 Idle reduction controller
100 SOC controller
110 Target SOC estimator
112 Driving environment predictor
114 Vehicle state predictor
116 SOC distribution request level calculator
118 Target SOC calculator
120 Battery SOC calculator
130 Feedback controller
200 Automobile

The invention claimed is:

1. A driving environment prediction device that predicts a driving environment of a vehicle that causes a vehicle stop, the driving environment prediction device comprising:
an electronic control unit (ECU) including a computer for executing programs stored in memory of the ECU, input and output ports connected with a plurality of sensors and actuators located on the vehicle, a first vehicle stop time rate calculator, and a second vehicle stop time rate calculator, the ECU configured to:
calculate a rate of vehicle stop time in a first period, as a first vehicle stop time rate, with the first vehicle stop time rate calculator;
calculate a rate of vehicle stop time in a second period which is longer than the first period, as second vehicle stop time rate, with the second vehicle stop time rate calculator;
predict the driving environment, based on the first vehicle stop time rate and the second vehicle stop time rate,
set a capacity for idle reduction, which is expected to be used in a stop and start period from an engine stop to an engine restart, in an available state of charge (SOC) range of the battery, during running of the vehicle, and
set the capacity for idle reduction, based on the first vehicle stop time rate and the second vehicle stop time rate.

2. The driving environment prediction device according to claim 1, wherein
the driving environment is classification of whether a vehicle driving area is an urban area or a suburban area, and
the ECU further comprises:
a first determining section which is configured to determine whether the first vehicle stop time rate is equal to or higher than a first reference value; and
a first specifying section which is configured to specify the driving environment as the urban area when it is determined that the first vehicle stop time rate is equal to or higher than the first reference value by the first determining section.

3. The driving environment prediction device according to claim 2, wherein
the ECU further comprises:
a second determining section which is configured to determine whether the second vehicle stop time rate is equal to or higher than a second reference value which is smaller than the first reference value; and
a second specifying section which is configured to specify the driving environment as the urban area when it is determined that the second vehicle stop time rate is equal to or higher than the second reference value by the second determining section.

4. The driving environment prediction device according to claim 3, wherein
the ECU further comprises:
a third determining section which is configured to determine whether the first vehicle stop time rate is less than a third reference value which is smaller than the first reference value;
a fourth determining section which is configured to determine whether the second vehicle stop time rate is less than a fourth reference value which is smaller than the second reference value; and
a third specifying section which is configured to specify the driving environment as the suburban area when it is determined that the first vehicle stop time rate is less than the third reference value by the third determining section and when it is determined that the second vehicle stop time rate is less than the fourth reference value by the fourth determining section.

5. A vehicle control device mounted on a vehicle having an engine and a battery chargeable with an amount of electric power generated by a generator which is driven with power of the engine, the vehicle control device comprising:
an idle reduction controller which is configured to perform idle reduction control;
an SOC detector which is configured to detect a state of charge (SOC) of the battery;
an idle reduction capacity setting section which is configured to set a capacity for idle reduction, which is expected to be used in a stop and start period from an engine stop to an engine restart by the idle reduction control, in an available SOC range of the battery, during running of the vehicle; and a remaining capacity controller which is configured to control the amount of electric power generated by the generator, in order to avoid a remaining capacity, which corresponds to the SOC detected by the SOC detector, in the available SOC range from becoming less than the capacity for idle reduction, during running of the vehicle, wherein the idle reduction capacity setting section comprises:
   a vehicle stop time rate calculator which is configured to calculate a rate of vehicle stop time in a predetermined period; and
   a capacity setting section which is configured to set the capacity for idle reduction, based on the rate of vehicle stop rate, the vehicle stop time rate calculator comprises:
   a first vehicle stop time rate calculator which is configured to calculate a rate of vehicle stop time in a first period, as a first vehicle stop time rate; and
   a second vehicle stop time rate calculator which is configured to calculate a rate of vehicle stop time in a second period which is longer than the first period, as a second vehicle stop time rate, wherein the capacity setting section sets the capacity for idle reduction, based on the first vehicle stop time rate and the second vehicle stop time rate.

6. The vehicle control device according to claim 5, wherein the capacity setting section comprises:
   a first determining section which is configured to determine whether the first vehicle stop time rate is equal to or higher than a first reference value; and
   a first specifying section which is configured to, when it is determined that the first vehicle stop time rate is equal to or higher than the first reference value by the first determining section, set the capacity for idle reduction to a larger value than a capacity set when it is determined that the first vehicle stop time rate is neither equal to nor higher than the first reference value.

7. The vehicle control device according to claim 6, wherein the capacity setting section further comprises:
   a second determining section which is configured to determine whether the second vehicle stop time rate is equal to or higher than a second reference value which is smaller than the first reference value; and
   a second specifying section which is configured to, when it is determined that the second vehicle stop time rate is equal to or higher than the second reference value by the second determining section, set the capacity for idle reduction to a larger value than a capacity set when it is determined that the second vehicle stop time rate is neither equal to nor higher than the second reference value.

8. The vehicle control device according to claim 7, wherein the idle reduction capacity setting section further comprises:
   a third determining section which is configured to determine whether the first vehicle stop time rate is less than a third reference value which is smaller than the first reference value;
   a fourth determining section which is configured to determine whether the second vehicle stop time rate is less than a fourth reference value which is smaller than the second reference value; and
   a third specifying section which is configured to set the capacity for idle reduction to a decreased value, when it is determined that the first vehicle stop time rate is less than the third reference value by the third determining section and when it is determined that the second vehicle stop time rate is less than the fourth reference value by the fourth determining section.

9. A driving environment prediction method of predicting a driving environment of a vehicle that causes a vehicle stop, the vehicle having an electronic control unit (ECU) including a computer for executing programs stored in memory of the ECU, input and output ports connected with a plurality of sensors and actuators located on the vehicle, a first vehicle stop time rate calculator, and a second vehicle stop time rate calculator, the driving environment prediction method comprising:

calculating a rate of vehicle stop time in a first period, as a first vehicle stop time rate, with the a first vehicle stop time rate calculator;

calculating a rate of vehicle stop time in a second period which is longer than the first period, as a second vehicle stop time rate with the second vehicle stop time rate calculator;

predicting the driving environment, based on the first vehicle stop time rate and the second vehicle stop time rate, setting a capacity for idle reduction, which is expected to be used in a stop and start period from an engine stop to an engine restart, in an available state of charge (SOC) range of the battery, during running of the vehicle, and setting the capacity for idle reduction, based on the first vehicle stop time rate and the second vehicle stop time rate.

10. A vehicle control method of controlling a vehicle having an engine and a battery chargeable with an amount of electric power generated by a generator which is driven with power of the engine, the vehicle control method comprising the steps of:

(a) performing idle reduction control;
(b) detecting a state of charge (SOC) of the battery;
(c) setting a capacity for idle reduction, which is expected to be used in a stop and start period from an engine stop to an engine restart by the idle reduction control, in an available SOC range of the battery, during running of the vehicle; and
(d) controlling the amount of electric power generated by the generator, in order to avoid a remaining capacity, which corresponds to the SOC detected by the step (b), in the available SOC range from becoming less than the capacity for idle reduction, during running of the vehicle, wherein the step (c) comprises:
   calculating a rate of vehicle stop time in a predetermined period; and
   setting the capacity for idle reduction, based on the rate of vehicle stop rate, the calculating a rate of vehicle stop time comprises:
   calculating a rate of vehicle stop time in a first period, as a first vehicle stop time rate; and
   calculating a rate of vehicle stop time in a second period which is longer than the first period, as a second vehicle stop time rate, wherein setting the capacity for idle reduction is based on the first vehicle stop time rate and the second vehicle stop time rate.

\* \* \* \* \*